United States Patent
Matsubara et al.

(10) Patent No.: US 10,675,815 B2
(45) Date of Patent: Jun. 9, 2020

(54) DATA PROCESSING APPARATUS, THREE-DIMENSIONAL MANUFACTURING SYSTEM, AND NON-TRANSITORY COMPUTER READABLE MEDIUM

(71) Applicant: FUJI XEROX CO., LTD., Tokyo (JP)

(72) Inventors: Koichi Matsubara, Kanagawa (JP); Kenji Hara, Kanagawa (JP); Ryosuke Yonesaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 331 days.

(21) Appl. No.: 15/646,418

(22) Filed: Jul. 11, 2017

(65) Prior Publication Data

US 2018/0104900 A1   Apr. 19, 2018

(30) Foreign Application Priority Data

Oct. 19, 2016   (JP) .................... 2016-205319

(51) Int. Cl.
  *B29C 64/393*   (2017.01)
  *G05B 19/042*   (2006.01)
  (Continued)

(52) U.S. Cl.
  CPC ........ *B29C 64/393* (2017.08); *G05B 19/0426* (2013.01); *G05B 19/4099* (2013.01); *B29C 64/106* (2017.08); *B29C 64/112* (2017.08); *B29C 64/386* (2017.08); *B29C 64/40* (2017.08); *B29K 2995/0021* (2013.01); *B29K 2995/0029* (2013.01); *B33Y 10/00* (2014.12); *B33Y 30/00* (2014.12); *B33Y 50/00* (2014.12);
  (Continued)

(58) Field of Classification Search
  CPC ... B29C 64/112; B29C 64/393; B29C 64/386; B29C 64/106; B29C 64/40; G05B 19/0426; G05B 19/408; G05B 19/4086; G05B 19/4093; G05B 19/4097; G05B 19/4099; G05B 2219/49023; G05B 2219/49019; G05B 2219/49008; G06T 19/20; G06T 2219/2012; B33Y 10/00; B33Y 30/00; B33Y 50/00; B33Y 50/02; B29K 2995/0021; B29K 2995/0029
  USPC .................... 425/162, 375; 264/308
  See application file for complete search history.

(56) References Cited

U.S. PATENT DOCUMENTS

| | | | |
|---|---|---|---|
| 2016/0151979 A1* | 6/2016 | Urban | B33Y 50/00 264/308 |
| 2016/0346996 A1 | 12/2016 | Hakkaku et al. | |
| 2017/0214821 A1* | 7/2017 | Morovic | H04N 1/32309 |

FOREIGN PATENT DOCUMENTS

| JP | 2013-075390 A | 4/2013 |
|---|---|---|
| JP | 2015-044299 A | 3/2015 |
| JP | 2015-147327 A | 8/2015 |

\* cited by examiner

*Primary Examiner* — Joseph S Del Sole
*Assistant Examiner* — Lawrence D. Hohenbrink, Jr.
(74) *Attorney, Agent, or Firm* — Oliff PLC

(57) ABSTRACT

A data processing apparatus includes:
  a receiving unit that receives first data defining a shape and a color of a three-dimensional object; and
  a generating unit, wherein when two or more color components interfere with each other in one voxel as a result of performing a halftoning process for each of plural color components based on color information in the first data, the generating unit generates color voxel data by assigning any one of the two or more color components in the first data as color information of the one voxel, using a density ratio of colors corresponding to the two or more color components in the first data.

15 Claims, 7 Drawing Sheets

(51) Int. Cl.
*G05B 19/4099* (2006.01)
*B33Y 50/00* (2015.01)
*G06T 19/20* (2011.01)
*G05B 19/408* (2006.01)
*B29C 64/40* (2017.01)
*B29C 64/112* (2017.01)
*B33Y 10/00* (2015.01)
*B29C 64/386* (2017.01)
*B29C 64/106* (2017.01)
*G05B 19/4093* (2006.01)
*G05B 19/4097* (2006.01)
*B33Y 30/00* (2015.01)
*B33Y 50/02* (2015.01)

(52) U.S. Cl.
CPC ............ *B33Y 50/02* (2014.12); *G05B 19/408* (2013.01); *G05B 19/4086* (2013.01); *G05B 19/4093* (2013.01); *G05B 19/4097* (2013.01); *G05B 2219/49008* (2013.01); *G05B 2219/49019* (2013.01); *G05B 2219/49023* (2013.01); *G06T 19/20* (2013.01); *G06T 2219/2012* (2013.01)

FIG.7

| | NUMBER OF PROCESSED VOXELS | CUMULATIVE NUMBER OF X DETERMINATION | CUMULATIVE NUMBER OF Y DETERMINATION | IDEAL VALUE OF X ABUNDANCE RATIO | CASE WHERE X IS SELECTED IN VOXEL | | CASE WHERE Y IS SELECTED IN VOXEL | | DETERMINATION |
|---|---|---|---|---|---|---|---|---|---|
| | | | | | X ABUNDANCE RATIO | DIFFERENCE FROM IDEAL VALUE | X ABUNDANCE RATIO | DIFFERENCE FROM IDEAL VALUE | |
| FIRST VOXEL | 0 | 0 | 0 | 30% | 100% | 70% | 0% | 30% | Y |
| SECOND VOXEL | 1 | 0 | 1 | 30% | 50% | 20% | 0% | 30% | X |
| THIRD VOXEL | 2 | 1 | 1 | 30% | 67% | 37% | 33% | 3% | Y |
| FOURTH VOXEL | 3 | 1 | 2 | 30% | 50% | 20% | 25% | 5% | Y |
| FIFTH VOXEL | 4 | 1 | 3 | 30% | 40% | 10% | 20% | 10% | X |
| SIXTH VOXEL | 5 | 2 | 3 | 30% | 50% | 20% | 33% | 3% | Y |
| ... | | | | | | | | | |

DATA PROCESSING APPARATUS, THREE-DIMENSIONAL MANUFACTURING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-205319 filed on Oct. 19, 2016.

BACKGROUND (i) Technical Field

The present invention relates to a data processing apparatus, a three-dimensional manufacturing system, and a non-transitory computer readable medium.

(ii) Related Art

In the related art, a three-dimensional manufacturing apparatus called a 3D printer has been proposed. As a three-dimensional manufacturing process using the 3D printer, there has been generally known a technique of receiving data that defines a shape and a color of an object (for example, polygon data) as input data, converting the received data into voxel data that is compatible with a three-dimensional manufacturing process of a manufacturing apparatus, and manufacturing the object based on the converted voxel data. Also, when the manufacturing apparatus is capable of outputting multiple coloring materials, a three-dimensional color object may be manufactured based on voxel data to which color information is assigned for each voxel.

SUMMARY

According to an aspect of the invention, a data processing apparatus includes:

a receiving unit that receives first data defining a shape and a color of a three-dimensional object; and a generating unit, wherein when two or more color components interfere with each other in one voxel as a result of performing a halftoning process for each of plural color components based on color information in the first data, the generating unit generates color voxel data by assigning any one of the two or more color components in the first data as color information of the one voxel, using a density ratio of colors corresponding to the two or more color components in the first data.

BRIEF DESCRIPTION OF THE DRAWINGS

Exemplary embodiments of the present invention will be described in detail based on the following figures, wherein:

FIG. 7 is an explanatory diagram of determination based on processed voxels.

DETAILED DESCRIPTION

Hereinafter, exemplary embodiments of the present invention will be described with reference to the accompanying drawings. The definitions of terms used in the present specification are as follows.

"Voxel": the smallest unit of a small cube used to express a three-dimensional object. A voxel corresponds to a pixel in a two-dimensional image. A three-dimensional object may be visualized by combining these voxels. Thus, when a three-dimensional object is generally manufactured by a manufacturing apparatus, the manufacturing is performed based on data describing an object to be manufactured as an aggregate of voxels. Further, similarly to two-dimensional pixels, if color information is added to each voxel, colors may be given in units of voxels.

"Voxel data": data describing an object to be manufactured as an aggregate of voxels.

"Color Voxel Data": voxel data in which color information is added to each voxel.

"Halftoning process": a process of determining whether or not to assign color information to each voxel by error diffusion, dither, or the like.

"Interference": multiple color components are assigned to one voxel.

Figure 1:
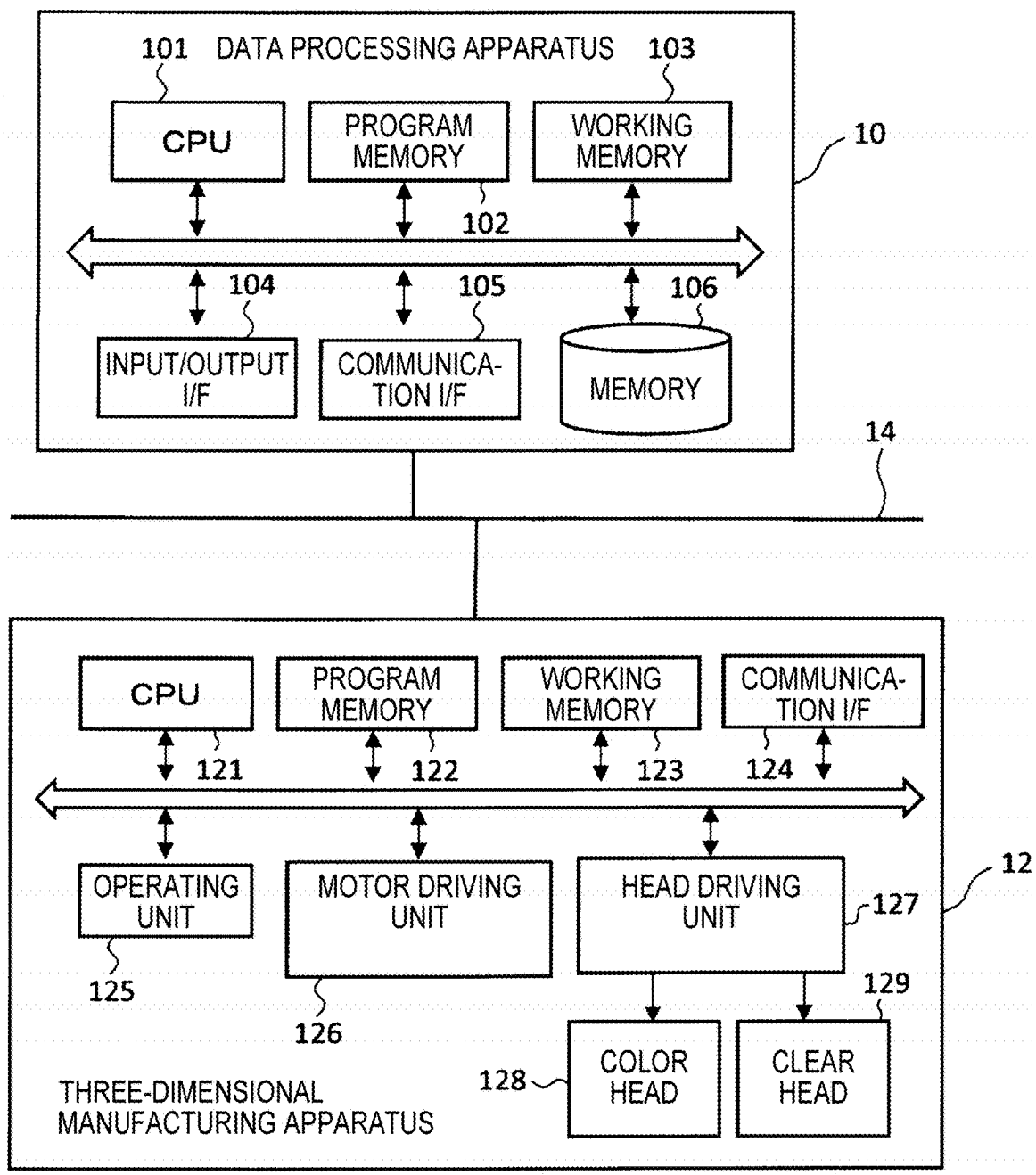
FIG. 1 is a system configuration diagram.

FIG. 1 is a configuration diagram of a three-dimensional manufacturing system according to an exemplary embodiment. The three-dimensional manufacturing system includes a data processing apparatus 10 and a three-dimensional manufacturing apparatus 12. The data processing apparatus 10 and the three-dimensional manufacturing apparatus 12 are connected to each other by a communication network 14.

The data processing apparatus 10 receives three-dimensional object data (3D data), performs a predetermined processing thereon, and outputs the processed data to the three-dimensional manufacturing apparatus 12 via the communication network 14. The data processing apparatus 10 includes a receiving unit and a generating unit. Specifically, the data processing apparatus 10 includes a CPU 101, a program memory 102 such as a ROM, an SSD, or an HDD, a working memory 103 such as a RAM, an input/output interface (I/F) 104 that performs input/output with a keyboard, a mouse, an optical disc such as a CD-ROM, a semiconductor memory such as a USB memory or an SD card, and a display, a communication interface (I/F) 105 that communicates with an external device including the three-dimensional manufacturing apparatus 12, and a memory 106 such as an HDD. The input/output I/F 104 and the communication I/F 105 correspond to the receiving unit. The CPU 101 corresponds to the generating unit. The data processing apparatus 10 may be configured with a computer, a tablet terminal, or the like.

The CPU 101 reads and executes a processing program stored in the program memory 102 to process the three-dimensional object data, and outputs the processed data to the three-dimensional manufacturing apparatus 12 via the communication I/F 105 and the communication network 14. The main processes executed by the CPU 101 are as follows:

A process of converting polygons constituting the three-dimensional object data (3D data) into voxels A process of determining, for each voxel, whether to set each voxel as a color voxel or an achromatic voxel A process of converting color data of each voxel into a data format that can be processed by the three-dimensional manufacturing apparatus 12

In the process of determining whether to set each voxel as a color voxel or an achromatic voxel includes a process of calculating a distance to a polygon closest to a processing target voxel. The process of determining color data for a color voxel uses the color density of the closest polygon. The process may use the distance to the closest polygon as necessary. The process of converting color data into the data format that can be processed by the three-dimensional manufacturing apparatus 12 includes a process of converting the color data of a color voxel into CMYK, a halftoning process, and a slice process.

The three-dimensional manufacturing apparatus 12 functions as a so-called 3D printer. The three-dimensional manufacturing apparatus 12 includes a CPU 121, a program memory 122 such as a ROM, a working memory 123, a communication interface (I/F) 124, an operating unit 125, a motor driving unit 126, a head driving unit 127, a color head 128, and a clear head 129.

In accordance with a processing program stored in the program memory 122, the CPU 121 outputs control signals to the motor driving unit 126 and the head driving unit 127 using the three-dimensional object data from the data processing apparatus 10 input via the communication I/F 124, based on an operation instruction from the operating unit 125, so as to drive various motors and heads.

The motor driving unit 126 drives various motors including a motor for moving a support base (stage) that supports the object being manufactured and a head moving motor.

The head driving unit 127 controls ejection of ink (manufacturing liquid) of each of the color head 128 and the clear head 129. The color head 128 is configured with a cyan (C) head, a magenta (M) head, a yellow (Y) head, and a black (K) head. In addition, the clear head 129 ejects transparent ink (manufacturing liquid) that is not colored. The head driving unit 127 controls ejection by, for example, driving piezoelectric elements provided in ejection channels of the respective heads but the driving method is not limited thereto. In addition, the clear head 129 may not eject transparent ink, but may eject white ink. "White" or "transparent" is defined as an achromatic color in contrast to cyan, magenta, yellow and black colors.

The three-dimensional manufacturing apparatus 12 ejects the inks of the color head 128 and the clear head 129 using the slice data of the three-dimensional object output from the data processing apparatus 10 and sequentially stacks the slices in the height direction to form a desired three-dimensional object. Specifically, the three-dimensional object is formed by ejecting ink (manufacturing liquid) while sequentially moving the color head 128 and the clear head 129 in three axial directions of XYZ. The color head 128 and the clear head 129 may be fixed, and the stage provided under the color head 128 and the clear head 129 may be sequentially moved in the three axial directions of XYZ.

The color head 128 may be configured with the cyan (C) head, the magenta (M) head, and the yellow (Y) head. Alternatively, the color head 128 may be configured with other different color heads in addition to the cyan (C) head, the magenta (M) head, the yellow (Y) head, and the black (K) head.

As the communication network 14, the Internet, a local area network (LAN), Wi-Fi (registered trademark), Bluetooth (registered trademark), or the like is used.

Figure 2:
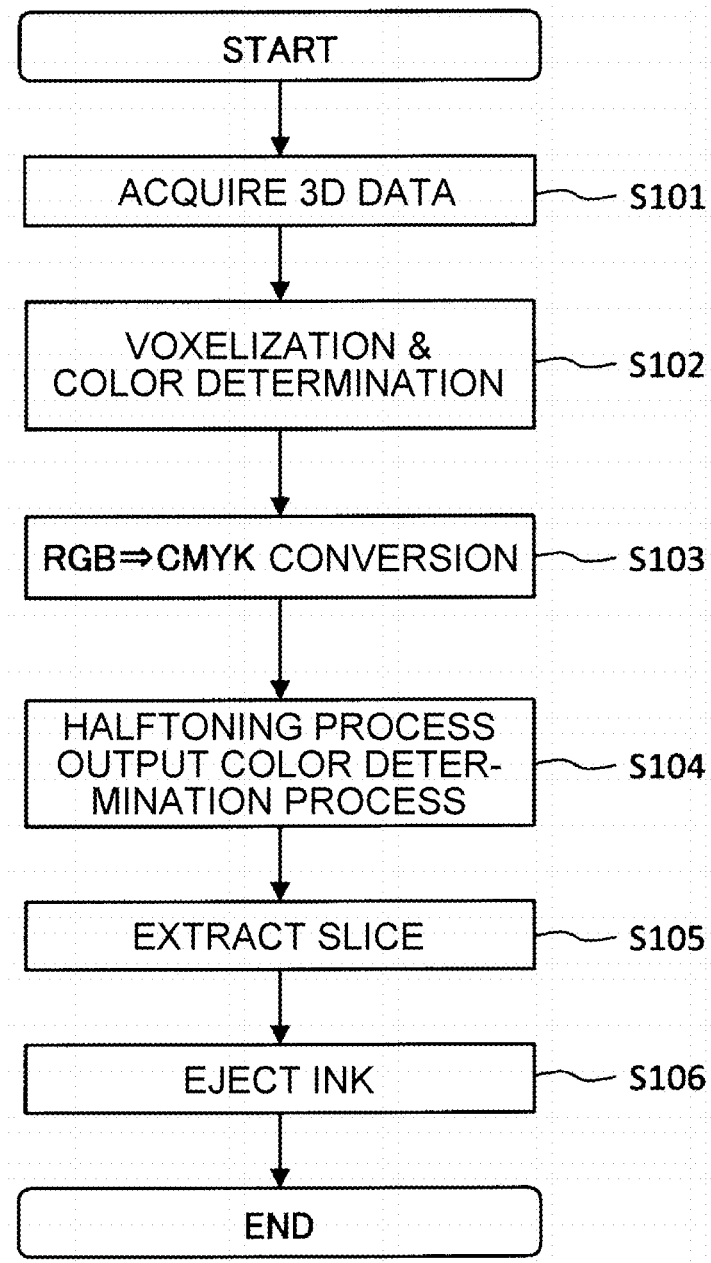
FIG. 2 is an overall process flowchart.

FIG. 2 is an overall process flowchart of the three-dimensional manufacturing system.

First, the CPU 101 of the data processing apparatus 10 acquires three-dimensional object data (3D data) (S101). The 3D data may be acquired from a keyboard, an optical disc such as a CD-ROM, a USB memory, or the like via the input/output I/F 104, or may be acquired from another computer connected to the communication network 14 via the communication I/F 105. The 3D data is data representing the three-dimensional shape of the object and represents the outer shape of the object and the color of the surface thereof. The 3D data is configured with, for example, polygons and includes color data (for example, RGB data) of the surface of the object. Each polygon is an element when an object is represented with a combination of triangles or rectangles. The format of 3D data is not particularly limited but may be a data format created by CAD software or a data format created by CG software.

Next, in accordance with the processing program stored in the program memory 102, the CPU 101 of the data processing apparatus 10 converts the 3D data into voxel data and determines the color data thereof (S102). The voxel data here has depth data D from the surface of the object and color data (r, g, b).

The depth data D indicates a distance between a voxel center and the polygon closest to the voxel center. For example, the depth data D is calculated as an average value of distances from the voxel center to respective points on the closest polygon (if the polygon is a triangle, respective vertexes of the triangle).

Further, the color data is set for each voxel by determining whether to set the voxel as a color voxel or an achromatic color (white or transparent) voxel based on the depth data D. If the depth data D for a voxel is equal to or less than a predetermined threshold value, the CPU 101 sets the voxel as a color voxel, and if the depth data D for the voxel exceeds the predetermined threshold value, the CPU 101 sets the voxel as an achromatic voxel. That is, voxels up to a predetermined depth from the surface are set as color voxels, and voxels deeper than the predetermined depth are set as achromatic voxels. For the color data of a color voxel, the color data of the closest polygon is used as it is.

Next, in accordance with the processing program, the CPU 101 of the data processing apparatus 10 converts the color data (r, g, b) assigned to each voxel into CMYK data (S103). Conversion from RGB to CMYK is well known, and complementary color conversion, a lookup table (LUT), or the like may be used as in 2D printers. It is assumed that the clear head 129 of the three-dimensional manufacturing apparatus 12 ejects colorless transparent ink (manufacturing liquid). In this case, if the color represented by the color data (r, g, b) is white (all values of RGB are the maximum values), the color is converted into the achromatic color.

Next, in accordance with the processing program, the CPU 101 of the data processing apparatus 10 determines the output color of each voxel by a halftoning process and an output color determination process (S104). The halftoning process is well known, and error diffusion, a threshold dither matrix, or the like may be used as in 2D printers. For example, in the halftoning process using the threshold dither matrix, a three-dimensional threshold dither matrix corresponding to each color of CMYK is stored in the program memory 102 in advance, and the color data and the values of the threshold dither matrix are compared for each color. If the color data of a voxel is equal to or greater than the threshold value, the voxel is determined to be "ON." If the color data of the voxel is less than the threshold value, the voxel is determined to be "OFF." Then, the color data of the voxel is left only when the voxel is determined to be "ON."

Assuming that the halftoning process is sequentially executed for respective colors of cyan (C), magenta (M), yellow (Y), and black (K) by dither, error diffusion, or the like. Here, attention is paid to a certain voxel (a normal lattice unit in a three-dimensional space). In some cases, multiple colors may interfere with each other in the voxel by the halftoning process. For example, for such a voxel, the determination result of cyan (C) is "ON," and the determination result of magenta (M) is also "ON."

Then, if multiple colors overlap and interfere with each other as described above, the CPU 101 selects one of the multiple colors using an input density and determines the color data of the voxel. The output color determination process will be described in more detail.

Through the halftoning process and the output color determination process in S104, the color data of each voxel becomes data representing one of cyan (C), magenta (M), yellow (Y), black (K), and achromatic color (white or transparent).

Next, in accordance with the processing program, the CPU 101 of the data processing apparatus 10 extracts data corresponding to one slice from the voxels whose color data has been determined (S105). The one slice corresponds to an amount by which the color head 128 and the clear head 129 of the three-dimensional manufacturing apparatus 12 are capable of ejecting during one movement. When extracting slice data from the voxels, the CPU 101 transmits the extracted slice data to the three-dimensional manufacturing apparatus 12 via the communication I/F 105 and the communication network 14.

The CPU 121 of the three-dimensional manufacturing apparatus 12 receives the slice data via the communication I/F 124, controls the motor driving unit 126 and the head driving unit 127 using the slice data, and ejects the ink (manufacturing liquid) from the color head 128 and the clear head 129 to manufacture the three-dimensional object (S106). The slice extraction and the ink ejection by the color head 128 and the clear head 129 are repeated, and slices are stacked in the height direction to manufacture the three-dimensional object.

Figure 3A:
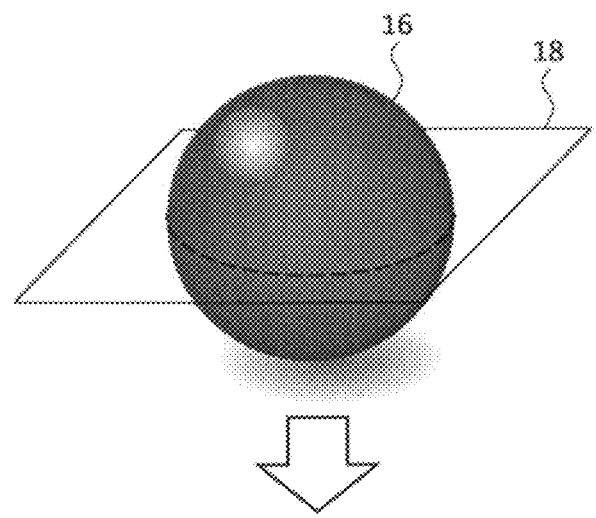
FIGS. 3A to 3C are explanatory diagrams of slice data.
Figure 3B:
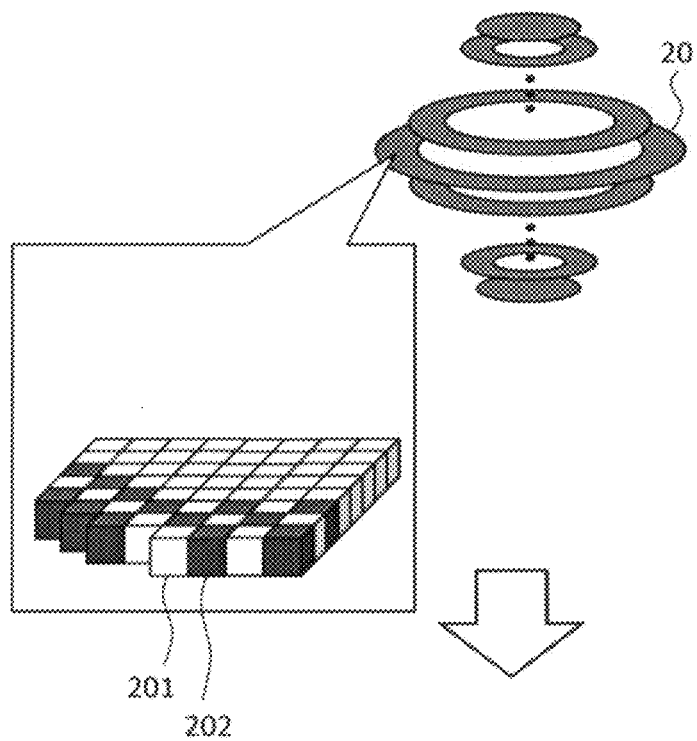
Figure 3C:
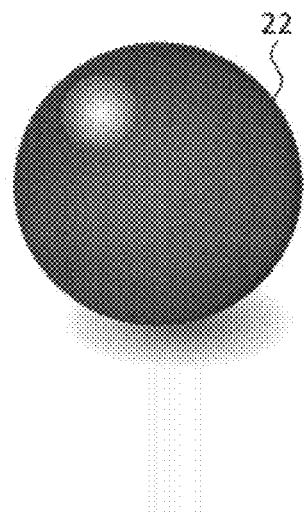

FIGS. 3A to 3C schematically illustrate the slice data. As illustrated in FIG. 3A, when the 3D data is converted into the voxel data and the color data of each voxel is determined, 3D data 16 configured with the voxels is sequentially sliced with a predetermined slice plane 18. Then, slice data 20 is extracted as illustrated in FIG. 3B. The slice data 20 is configured with multiple voxel data and includes data of achromatic voxels 201 and data of color voxels 202. Whether each voxel becomes the achromatic voxel 201 or the color voxel 202 is automatically determined from the color density of the polygon closest to the voxel and the depth data D of the voxel as described above.

Next, the halftoning process of each voxel in the CPU 101 will be described.

Figure 4A:
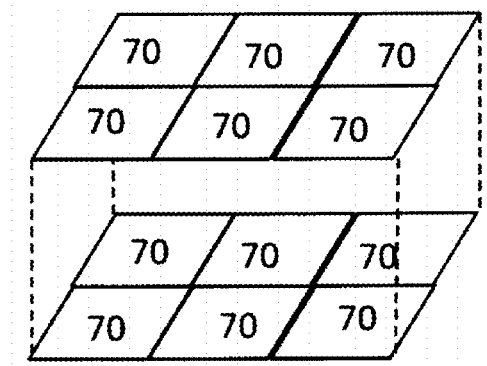
FIGS. 4A to 4C are explanatory diagrams of a halftoning process.
Figure 4B:
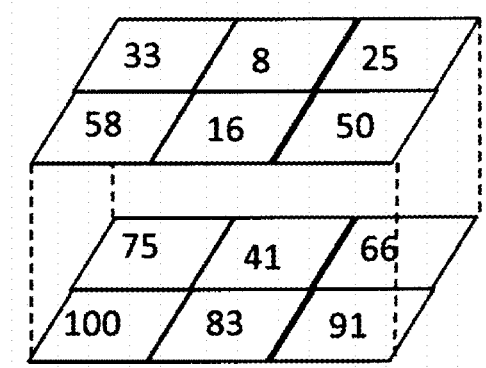
Figure 4C:
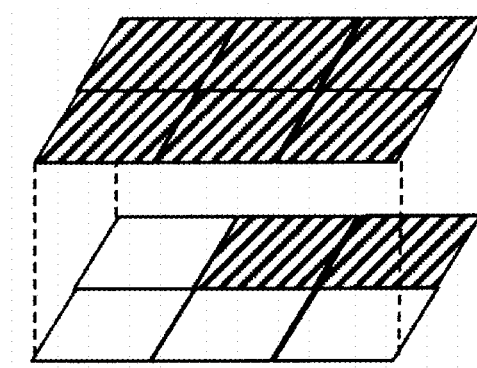

FIGS. 4A to 4C schematically illustrate the halftoning process using a dither matrix by way of example. FIG. 4A illustrates input density data of cyan (C). The number indicates the density of cyan (C) in each voxel. FIG. 4B illustrates a 3D dither matrix of cyan (C). A value shown in FIG. 4B indicates a threshold value for each voxel. In general, sizes of matrices for respective colors may be different from each other. Alternatively, arrangements of threshold values in the matrices for the respective colors may be different from each other. For each voxel, the input density and the threshold value are compared, and the following determination is made:

ON if the input density>the threshold value, or

OFF if the input density≤the threshold value. A color of the voxels determined to be ON is determined to be cyan (C), and a color of the voxels determined to be OFF is determined to be achromatic. This process is executed for all voxels of each color.

If ON/OFF is determined by comparing the input densities and the threshold values for each color, the determination result for one voxel should be one of the following four types.

(1) Any color is determined to be OFF.

(2) Only one of the colors is determined to be ON.

(3) Two colors are determined to be ON.

(4) Three or more colors are determined to be ON.

Among the four types, in the case of (1), the color of the voxel in interest is determined to be an achromatic color. Also, in the case of (2), the color of the voxel in interest is determined to be a color voxel having the color that is determined to be ON. On the other hand, in the case of (3) and (4), since the multiple colors interfere with each other, it is necessary to determine the color of the voxel in interest to be any one of the colors by some method. This is because only one color of ink (manufacturing liquid) can be ejected to one voxel.

Figure 5:
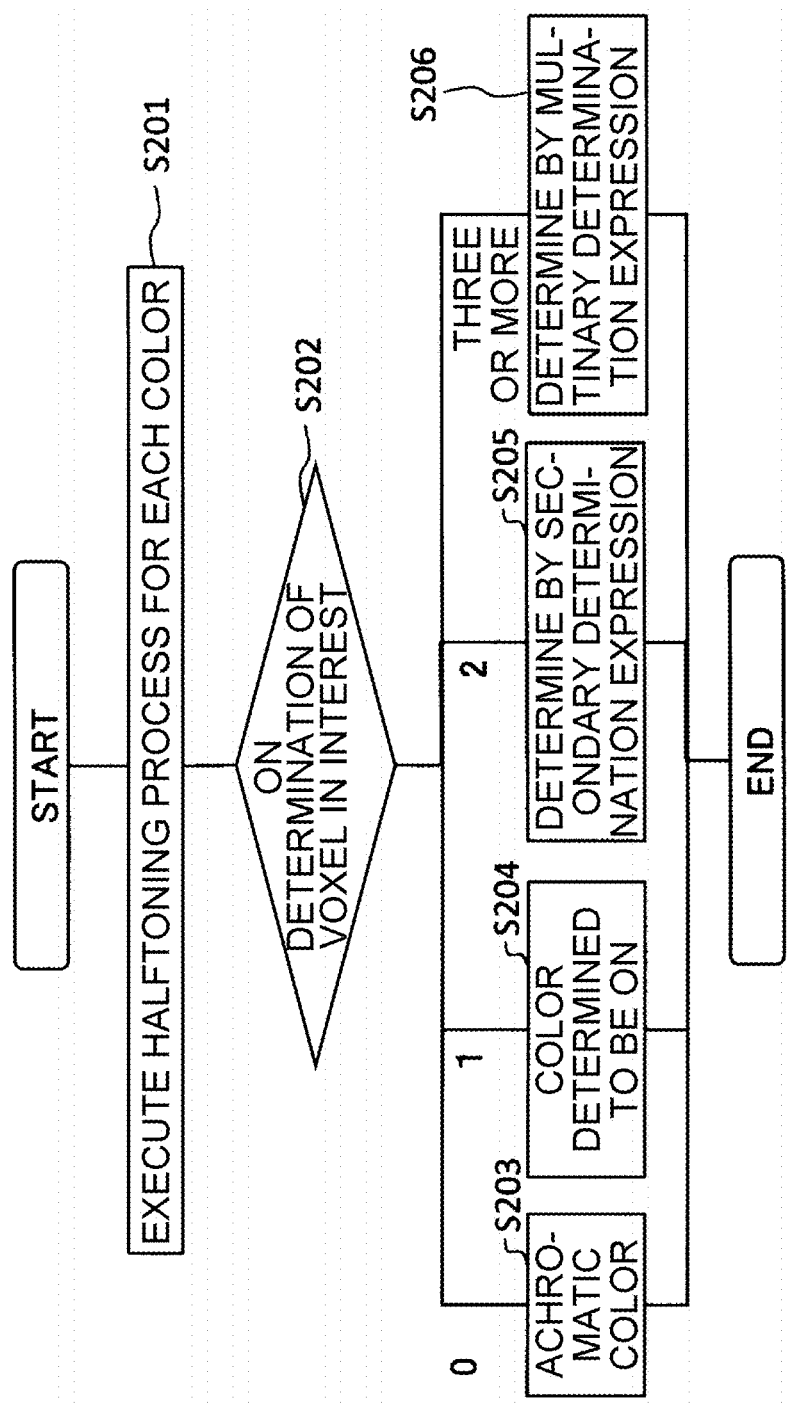
FIG. 5 is a process flowchart of an exemplary embodiment.

FIG. 5 is a flowchart of the halftoning process in the CPU 101.

After the color data (r, g, b) assigned to each voxel is converted into the CMYK data (S103 in FIG. 2), the CPU 101 executes the halftoning process for each color using the dither matrix (S201). Through this process, the ON/OFF determination is made for each color of each voxel. The results of the ON/OFF determination are stored in the working memory 103. For example, it is assumed that voxels are referred to as voxel 1, voxel 2, voxel 3, . . . .

Voxel 1: C (ON), M (OFF), Y (OFF), K (OFF)

Voxel 2: C (ON), M (ON), Y (OFF), K (OFF)

Voxel 3: C (OFF), M (OFF), Y (OFF), K (OFF)

.
.

and the like.

Next, the CPU 101 counts the number of ONs for a processing target voxel (voxel in interest) (S202).

If the number of ONs is zero, the voxel in interest is determined to be the achromatic color (S203).

If the number of ONs is one, the voxel in interest is determined to be the color determined to be ON (S204).

If the number of ONs is two, the color of the voxel in interest is determined by a predetermined secondary color determination expression (S205).

If the number of ONs is three or more, the color of the voxel in interest is determined by a predetermined multinary color determination expression (S206).

Hereinafter, the secondary color determination expression and the multinary color determination expression will be described.

<Secondary Color Determination Expression>

Assuming that as a result of the halftoning process with the input color that is a secondary color including x % of a color X and y % of a color Y, both of the two colors X and Y are determined to be ON. In this case, the output color is determined by using a pseudo random number based on the input density, so as to satisfy:

a probability that color $X$ is selected=$y/(x+y)$ a probability that color $Y$ is selected=$x/(x+y)$ Specifically, for random numbers that generate a pseudo random number sequence that outputs values equal to or greater than 0 and less than 1, the output color is determined based on $$0 \le x < y/(x+y) \le y < 1$$

More specifically, assuming that as a result of the halftoning process for the input color that is a secondary color including x % of the color X and y % of the color Y, the following ratio is obtained:

only the color X is ON=x1%
only the color Y is ON=y1%
both the color X and the color Y are ON=xy1%
both the color X and the color Y are OFF (achromatic voxel)=xy0%

In this case, the output color is determined for the voxel=xy1% in which the color X and the color Y are both ON.

Further assuming that $$x1 = x - xy1$$

$$y1 = y - xy1$$

$$x1 + y1 + xy1 + xy0 = 1$$

These relationships can be written as $$(x - xy1) + (y - xy1) + xy1 + xy0 = 1$$

This expression can be further simplified as $$xy1 = x + y + xy0 - 1$$

The proportion finally occupied by the color X (x2) is $$\begin{aligned}
x2 &= x1 + xy1 * y/(x+y) \\
&= (x - (x+y+xy0-1)) + (x+y+xy0-1) * y/(x+y) \\
&= ((x+y)*(-y-xy0+1)) + y*(x+y+xy0-1))/(x+y) \\
&= x*(1-xy0)/(x+y)
\end{aligned}$$

Similarly, the proportion finally occupied by the color Y (y2) is $$\begin{aligned}
y2 &= y1 + xy1 * x/(x+y) \\
&= y*(1-xy0)/(x+y)
\end{aligned}$$

This result means that an output color (hue) equivalent to the input color is obtained because the input density ratio x:y of the color X and the color Y is maintained.

More specific description will be given below.

If a three-dimensional object has an input color which is a secondary color including 70% of cyan (C) and 30% of magenta (M), the input density ratio of cyan (C) and magenta (M) is 7:3.

As a result of the halftoning process, a voxel ratio, as an expected values, is as follows.

only cyan (C) is ON=0.7*(1−0.3)=49% only magenta (M) is ON=(1−0.7)*0.3=9% both cyan (C) and magenta (M) are ON=0.7*0.3=21% both cyan (C) and magenta (M) are OFF (achromatic voxel)=(1−0.7)*(1−0.3)=21%

In the case of determining, for a ratio of the voxels=21% in which both cyan (C) and magenta (M) are ON, whether to set the output color of the voxel to cyan (C) or magenta (M), the followings are obtained from the above equations.

A probability that cyan (C) is ON=30/(70+30)=0.3

A ratio of the voxels which is assigned to cyan (C)=21*30/(70+30)=6.3%

A ratio of the final cyan (C) voxels=49+6.3=55.3%

A probability that magenta (M) is ON=70/(70+30)=0.7

A ratio of the voxels which is assigned to magenta (M)=21*70/(70+30)=14.7%

A ratio of the final magenta (M) voxels=9+14.7=23.7%

A ratio of the final achromatic voxels=21%

The ratio of the final cyan (C) voxels to the final magenta (M) voxels is 55.3:23.7=70:30

The input density ratio of cyan (C) and magenta (M) is maintained. That is, an output color (hue) equivalent to the input color is obtained.

As described above, since the secondary color determination expression is used, an output color equivalent to the input color is obtained by determining the color such that the probability of selection becomes lower as the input density is higher (darker) or by setting the probability of selection in inverse proportion to the input density to determine the color.

<Multinary Color Determination Expression>

Assuming that as a result of the halftoning process for the input color that is a tertiary color including x % of a color X, y % of a color Y, and z % of a color Z, all the three colors are determined to be ON. In this case, the output color is determined by using a pseudo random number based on the input density, so as to satisfy:

a probability that the color X is selected=$(y+z-x)/(x+y+z)$ a probability that the color Y is selected=$(z+x-y)/(x+y+z)$ a probability that the color Z is selected=$(x+y-z)/(x+y+z)$ Specifically, for a random number generating a pseudo random number sequence value that outputs a value equal to or greater than 0 and less than 1, the output color is determined based on $0 \leq x < (y+z-x)/(x+y+z) \leq y < (y+z-x)/(x+y+z)+(z+x-y)/(x+y+z) \leq z < 1$ As a result, an output color (hue) equivalent to the input color is obtained. The same is true for a tertiary or higher color.

Depending on the input density of the multinary color, such a color may be generated that the result of the calculation shows the negative probability of selection. In this case, the probability for the color may be changed to zero, and the other colors may be corrected so that the sum of the probabilities for the other colors becomes 1 while the ratio of the probabilities for the other colors is maintained. By using the multinary color determination expression, as in the case of the secondary color determination expression, an output color equivalent to the input color is obtained by determining the color such that a probability of selection becomes lower as the input density is higher (darker).

Figure 6:
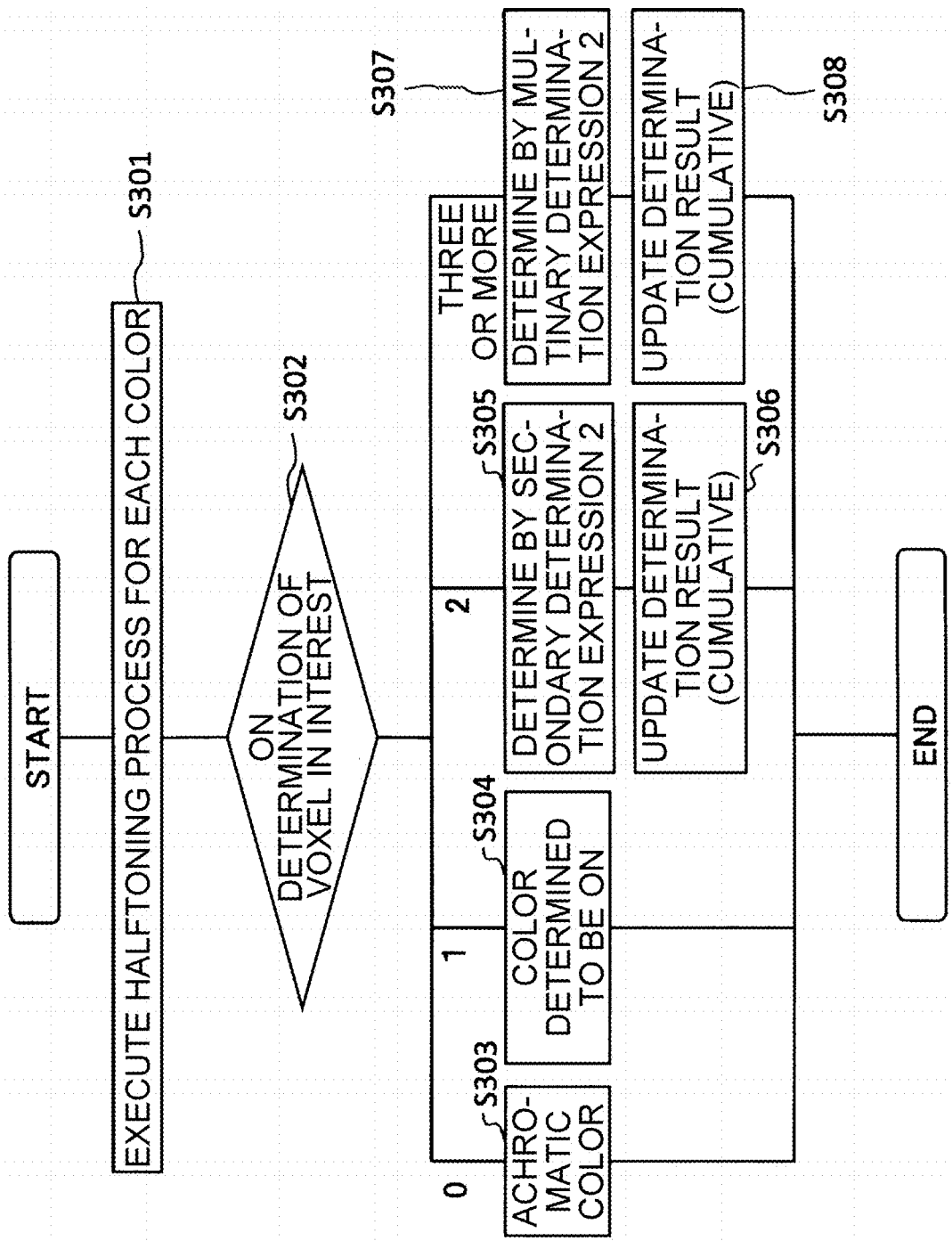
FIG. 6 is a process flowchart of another exemplary embodiment.

FIG. 6 is a flowchart of another halftoning process in the CPU 101.

After converting the color data (r, g, b) assigned to each voxel into CMYK data (S103 in FIG. 2), the CPU 101 executes a halftoning process for each color using a dither matrix (S301). Through this process, the ON/OFF determination is made for each color of each voxel. The results of the ON/OFF determination are stored in the working memory 103. For example, assuming that voxels are referred to as voxel 1, voxel 2, voxel 3, . . . .

Voxel 1: C (ON), M (OFF), Y (OFF), K (OFF)
Voxel 2: C (ON), M (ON), Y (OFF), K (OFF)
Voxel 3: C (OFF), M (OFF), Y (OFF), K (OFF)
.
.
and the like.

Next, the CPU 101 counts the number of ONs of the processing target voxel (voxel in interest) (S302).

If the number of ONs is zero, the voxel is determined to be an achromatic color (S303).

If the number of ONs is one, the voxel is determined to be a color determined to be ON (S304).

If the number of ONs is two, the color is determined by a predetermined secondary color determination expression 2 (S305), and furthermore, the determination result is updated (S306).

If the number of ONs is three or more, the color is determined by a predetermined multinary color determination expression 2 (S307), and furthermore, the determination result is updated (S308).

Hereinafter, the secondary color determination expression 2 and the multinary color determination expression 2 will be described.

<Secondary Color Determination Expression 2>

As a result of the halftoning process for the input color that is a secondary color including x % of a color X and y % of a color Y, if both of the two colors are determined to be ON, similarly to the secondary color determination expression as described above, the output color is determined based on the input density, so as to satisfy:

a probability (ideal value) that the color $X$ is selected=$y/(x+y)$ a probability (ideal value) that color $Y$ is selected=$x/(x+y)$ Then, in the final determination as to whether to select the color X or the color Y, one that is closer to the ideal value is selected based on the total number of previously processed secondary color voxels and the determination result (the number of voxels of the color X and the number of voxels of the color Y).

For example, FIG. 7 illustrates a case where the color X is 70% and the color Y is 30%.

In FIG. 7, for the first voxel, the number of processed voxels is 0, and the ideal value of the abundance ratio of the color X is 30/(70+30)=30%. In the case where the color X is selected for the first voxel, the abundance ratio of the color X is 100%, and the difference from the ideal value is 100−30=70%. In addition, in the case where the color Y is selected for the first voxel, the abundance ratio of the color X is 0%, and the difference from the ideal value is 30%.

Then, the color Y, which has a smaller difference from the ideal value, is selected from:
the difference when the color X is selected: 70%
the difference the when color Y is selected: 30%

For the second voxel, the number of processed voxels is 1, the cumulative number of determination of the color X is 0, and the cumulative number of determination of the color Y is 1. Further, in the case where color X is selected for the second voxel, the abundance ratio of the color X is 50%, and the difference from the ideal value is 20%. In addition, in the case where the color Y is selected for the second voxel, the abundance ratio of the color X is 0%, and the difference from the ideal value is 30%. Thus, the color X, which has a smaller difference from the ideal value, is selected.

For the third voxel, the number of processed voxels is 2, the cumulative number of determination of the color X is 1, and the cumulative number of determination of the color Y is 1. Further, in the case where the color X is selected for the third voxel, the abundance ratio of the color X is 67%, and the difference from the ideal value is 37%. In addition, in the case where the color Y is selected for the third voxel, the abundance ratio of the color X is 33%, and the difference from the ideal value is 3%. Thus, the color Y, which has a smaller difference from the ideal value, is selected.

For the fourth voxel, the number of processed voxels is 3, the cumulative number of determination of the color X is 1, and the cumulative number of determination of the color Y is 2. Further, in the case where color X is selected for the fourth voxel, the abundance ratio of the color X is 50%, and the difference from the ideal value is 20%. In addition, in the case where the color Y is selected for the fourth voxel, the abundance ratio of the color X is 25%, and the difference from the ideal value is 5%. Thus, the color Y, which has a smaller difference from the ideal value, is selected.

For the fifth voxel, the number of processed voxels is 4, the cumulative number of determination of the color X is 1, and the cumulative number of determination of the color Y is 3. Further, in the case where the color X is for in the fifth voxel, the abundance ratio of the color X is 40%, and the difference from the ideal value is 10%. In addition, in the case where the color Y is selected for the fifth voxel, the abundance ratio of the color X is 20%, and the difference from the ideal value is 10%. In this case, since the differences from the ideal value are the same, either of the colors X or Y may be selected. For example, the color X is selected.

For the sixth voxel, the number of processed voxels is 5, the cumulative number of determination of the color X is 2, and the cumulative number of determination of the color Y is 3. Further, in the case where color X is selected for the sixth voxel, the abundance ratio of the color X is 50%, and the difference from the ideal value is 20%. In addition, in the case where the color Y is selected for the sixth voxel, the abundance ratio of the color X is 33%, and the difference from the ideal value is 3%. Thus, the color Y, which has a smaller difference from the ideal value, is selected.

For each of the subsequent voxels, similarly, a color, which has a smaller difference from the ideal value, is selected based on the determination results of the previously processed voxels. Assuming that the color X is cyan (C) and the color Y is magenta (M), the respective voxels become as follows.

First voxel: magenta (M)
Second voxel: cyan (C)
Third voxel: magenta (M)
Fourth voxel: magenta (M)
Fifth voxel: cyan (C)
Sixth voxel: magenta (M)

The output color is determined more appropriately in consideration of the determination results of the previously processed voxels.

<Multinary Color Determination Expression 2>

As a result of the halftoning process for the input color that is a tertiary color including x % of a color X, y % of a color Y, and z % of a color Z, if all the three colors are determined to be ON, similarly to the multinary color determination expression as described above, the output color is determined based on the input density so as to satisfy:

a probability that the color X is selected=$(y+z-x)/(x+y+z)$ a probability that the color Y is selected=$(z+x-y)/(x+y+z)$ a probability that the color Z is selected=$(x+y-z)/(x+y+z)$ Then, in the final determination as to which of the X color, the Y color, and the Z color i selected, a color that is closest to the ideal value is selected based on the total number of previously processed voxels and the determination result (the number of voxels of the color X, the number of voxels of the color Y, and the number of voxels of the color Z).

Although the exemplary embodiment of the present invention has been described above, the present invention is not limited thereto. Various modifications may be made thereon. Hereinafter, the modifications will be described.

<Modification 1>

In the exemplary embodiment, as illustrated in FIG. 2, when the 3D data is acquired (S101), the 3D data is converted into voxel data to determine whether to set the voxel as a color voxel (S102), and then RGB data is converted into CMYK data (S103). Alternatively, after the 3D data is acquired, the RGB data may be converted into the CMYK data, and then converted into voxel data to determine whether or not to be a color voxel.

In the exemplary embodiment, the color data of the 3D data input to the data processing apparatus 10 is RGB. Alternatively, the color data of the 3D data may be CMYK from the beginning.

<Modification 2>

In the exemplary embodiment, the distance between the processing target voxel and the closest polygon is calculated. In this case, however, a polygon present within the radius R in relation to the processing target voxel is searched for. If no polygon is present, the radius R may be sequentially increased, and the distance from the polygon present within the radius R may be calculated.

<Modification 3>

In the exemplary embodiment, the color data of the polygon closest to the processing target voxel is used so as to determine the color data of the processing target voxel. Alternatively, the color data of the processing target voxel may be corrected such that the color becomes lighter as the processing target voxel becomes deeper.

<Modification 4>

In the exemplary embodiment, the data processing apparatus 10 and the three-dimensional manufacturing apparatus 12 are separately provided and connected to each other so as to send and receive data through the communication network 14. Alternatively, the data processing apparatus 10 and the three-dimensional manufacturing apparatus 12 may be physically integrated to constitute a three-dimensional manufacturing system.

In addition, the data processing apparatus 10 and the network server may be connected by the communication network 14 such that the data processing apparatus 10 serving as a client transmits acquired 3D data to the network server, and the network server executes the processes from S101 to S105 of FIG. 2 and returns the slice data to the data processing apparatus 10 serving as the client or outputs the slice data to the three-dimensional manufacturing apparatus 12. In this case, the network server functions as the data processing apparatus 10.

<Modification 5>

In the exemplary embodiment, the steps from S101 to S105 in FIG. 2 are executed by the data processing apparatus 10, and the step of S106 is executed by the three-dimensional manufacturing apparatus 12. Alternatively, the steps up to S103 or S104 may be executed by the data processing apparatus 10, and the remaining steps may be executed by the three-dimensional manufacturing apparatus 12. In short, the data processing apparatus 10 may execute the processing of S102 and output the resultant voxel data (including color voxel data and achromatic voxel data) to the three-dimensional manufacturing apparatus 12. The output data of the data processing apparatus 10 may be temporarily stored in a recording medium or the like and supplied from the recording medium to the three-dimensional manufacturing apparatus 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute data processing comprising:

receiving first data defining a shape and a color of a three-dimensional object;

when two or more color components in the first data interfere with each other, with respect to one voxel of a plurality of voxels, after performing a halftoning process for each of a plurality of color components based on color information in the first data, generating color voxel data by assigning any one of the two or more color components in the first data as color information to the one voxel, using a density ratio of colors corresponding to the two or more color components in the first data; and when a first color, a second color, and a third color interfere with each other, outputting any one of the first color, the second color, and the third color so as to satisfy:

a probability that the first color is selected=$(y+z-x)/(x+y+z)$ a probability that the second color is selected=$(z+x-y)/(x+y+z)$ a probability that the third color is selected=$x+y-z)/(x+y+z)$ provided that a density ratio of the first color, the second color, and the third color is x:y:z.

2. A data processing apparatus comprising:

a receiving unit that receives first data defining a shape and a color of a three-dimensional object; and a generating unit, wherein
when two or more color components in the first data interfere with each other, with respect to one voxel of a plurality of voxels, after performing a halftoning process for each of a plurality of color components based on color information in the first data, the generating unit generates color voxel data by assigning any one of the two or more color components in the first data as color information to the one voxel, using a density ratio of colors corresponding to the two or more color components in the first data, and
when a first color, a second color, and a third color interfere with each other, the generating unit outputs any one of the first color, the second color, and the third color so as to satisfy:

a probability that the first color is selected=$(y+z-x)/(x+y+z)$;

a probability that the second color is selected=$(z+x-y)/(x+y+z)$;

a probability that the third color is selected=$(x+y-z)/(x+y+z)$, provided that a density ratio of the first color, the second color, and the third color is x:y:z.

3. The data processing apparatus according to claim 2, wherein
the plurality of color components are color components corresponding to a plurality of color signals that are compatible with a three-dimensional manufacturing process of a three-dimensional manufacturing apparatus, and
the generating unit generates the color voxel data so that any one color component among the plurality of color components is assigned as the color information to each of the plurality of voxels.

4. The data processing apparatus according to claim 2, wherein the generating unit outputs any one of the colors with a probability that is inversely proportional to the density ratio of the two or more color components.

5. The data processing apparatus according to claim 2, wherein the generating unit outputs any one of the colors with a probability so that the probability decreases as the density ratio of the two or more color components increases.

6. The data processing apparatus according to claim 2, wherein when only the first color and the second color interfere with each other, the generating unit outputs any one of the first color and the second color so as to satisfy:

a probability that the first color is selected =$y/(x+y)$;

a probability that the second color is selected=$x/(x+y)$, provided that a density ratio of the first color and the second color is x:y.

7. The data processing apparatus according to claim 2, wherein the generating unit outputs any one of the colors using a total number of voxels to which a color component has been assigned and an output result thereof in addition to the density ratio of the two or more color components.

8. A three-dimensional manufacturing system comprising:
the data processing apparatus according to claim 2; and
a three-dimensional manufacturing apparatus that forms the three-dimensional object using data output from the data processing apparatus.

9. A data processing apparatus comprising:
a receiving unit that receives first data defining a shape and a color of a three-dimensional object;
a determining unit that determines, for each of a plurality of color components, whether or not to assign color information to each voxel, of a plurality of voxels, based on color information in the first data; and
a generating unit, wherein
when the determining unit determines that two or more color components in the first data are assigned to one voxel, of the plurality of voxels, the generating unit generates color voxel data by assigning any one of the two or more color components in the first data as color information to the one voxel, using a density ratio of colors corresponding to the two or more color components in the first data, and
when a first color, a second color, and a third color interfere with each other, the generating unit outputs any one of the first color, the second color, and the third color so as to satisfy:

a probability that the first color is selected=$(y+z-x)/(x+y+z)$;

a probability that the second color is selected=$(z+x-y)/(x+y+z)$;

a probability that the third color is selected=$x+y-z)/(x+y+z)$, provided that a density ratio of the first color, the second color, and the third color is x:y:z.

10. The data processing apparatus according to claim 9, wherein
the plurality of color components are color components corresponding to a plurality of color signals that are compatible with a three-dimensional manufacturing process of a three-dimensional manufacturing apparatus, and
the generating unit generates the color voxel data so that any one color component among the plurality of color components is assigned as the color information to each of the plurality of voxels.

11. The data processing apparatus according to claim 9, wherein the generating unit outputs any one of the colors with a probability that is inversely proportional to the density ratio of the two or more color components.

12. The data processing apparatus according to claim 9, wherein the generating unit outputs any one of the colors with a probability so that the probability decreases as the density ratio of the two or more color components increases.

13. The data processing apparatus according to claim 9, wherein when only the first color and the second color interfere with each other, the generating unit outputs any one of the first color and the second color so as to satisfy:

a probability that the first color is selected =$y/(x+y)$;

a probability that the second color is selected =$x/(x+y)$, provided that a density ratio of the first color and the second color is x:y.

14. The data processing apparatus according to claim 9, wherein the generating unit outputs any one of the colors using a total number of voxels to which a color component has been assigned and an output result thereof in addition to the density ratio of the two or more color components.

15. A three-dimensional manufacturing system comprising:
the data processing apparatus according to claim 9; and
a three-dimensional manufacturing apparatus that forms the three-dimensional object using data output from the data processing apparatus.

* * * * *